US008958481B2

(12) United States Patent
Lin et al.

(10) Patent No.: US 8,958,481 B2
(45) Date of Patent: *Feb. 17, 2015

(54) METHOD AND SYSTEM FOR VIDEO ENCODING AND DECODING

(71) Applicant: Apple Inc., Cupertino, CA (US)

(72) Inventors: Ken Kengkuan Lin, Redwood City, CA (US); Peter Hungye Chou, Sunnyvale, CA (US); Mitchell Howard Oslick, Moutain View, CA (US); Gregory Kent Wallace, Palo Alto, CA (US); Shahriar M. Akramullah, Folsom, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/075,780

(22) Filed: Nov. 8, 2013

(65) Prior Publication Data

US 2014/0064382 A1 Mar. 6, 2014

Related U.S. Application Data

(63) Continuation of application No. 11/735,045, filed on Apr. 13, 2007, now Pat. No. 8,582,656.

(51) Int. Cl.
*H04N 11/02* (2006.01)
*H04N 19/176* (2014.01)
(Continued)

(52) U.S. Cl.
CPC ... *H04N 19/00278* (2013.01); *H04N 19/00272* (2013.01); *H04N 19/00109* (2013.01); *H04N 19/00781* (2013.01); *H04N 19/00521* (2013.01); *H04N 19/00951* (2013.01)
USPC .............. 375/240.18; 375/240.25; 382/245; 382/248

(58) Field of Classification Search
CPC .................. H04N 19/00951; H04N 19/00272; H04N 19/00109; H04N 19/00781; H04N 19/00521; H04N 19/00278
USPC ........... 375/240.18, 240.24, 240.25; 382/245, 382/248
See application file for complete search history.

(56) References Cited

U.S. PATENT DOCUMENTS 2,905,756 A 9/1959 Graham
4,245,248 A 1/1981 Netravali et al.
(Continued)

FOREIGN PATENT DOCUMENTS

EP 0422404 A2 4/1991
EP 0283715 A2 9/1998

OTHER PUBLICATIONS

"Status and Direction of the MPEG-4 Standard", Atul Puri, AT&T Bell Laboratories, Holmdel, New Jersey, Multimedia Communications and Video Coding, 1996, Wang et al, Editors, pp. 349-356, Plenum Press, New York.

(Continued)

*Primary Examiner* — Baotran N To
(74) *Attorney, Agent, or Firm* — Kenyon & Kenyon LLP

(57) ABSTRACT

Methods and systems are provided for encoding and decoding a video stream. Each picture in a video stream can be divided into slices, each of which contains a contiguous row of macroblocks. All the blocks corresponding to a single video component within each slice can then be used as the basis for encoding the picture. By decomposing each picture into slices, the video stream can be efficiently converted for displays of varying size and/or quality. The encoded bitstream can include a slice table to allow direct access to each slice without reading the entire bitstream. Each slice can also be processed independently, allowing for parallelized encoding and/or decoding.

20 Claims, 8 Drawing Sheets

(51) Int. Cl.
H04N 19/174 (2014.01)
H04N 19/129 (2014.01)
H04N 19/61 (2014.01)
H04N 19/436 (2014.01)
H04N 19/91 (2014.01)

(56) References Cited

U.S. PATENT DOCUMENTS

| | | | |
|---|---|---|---|
| 4,399,461 | A | 8/1983 | Powell |
| 4,717,956 | A | 1/1988 | Morehead et al. |
| 4,853,775 | A | 8/1989 | Rouvrais et al. |
| 5,001,559 | A | 3/1991 | Gonzales et al. |
| 5,060,064 | A | 10/1991 | Lamnabhi et al. |
| 5,081,532 | A | 1/1992 | Rabii |
| 5,116,287 | A | 5/1992 | Hironaka et al. |
| 5,196,933 | A | 3/1993 | Henot |
| 5,225,904 | A | 7/1993 | Golin et al. |
| 5,473,376 | A | 12/1995 | Auyeung |
| 5,561,477 | A | 10/1996 | Polit |
| 5,600,375 | A | 2/1997 | Wickstrom |
| 5,699,119 | A | 12/1997 | Chung et al. |
| 5,737,022 | A | 4/1998 | Yamaguchi et al. |
| 5,764,296 | A | 6/1998 | Shin |
| 5,764,374 | A | 6/1998 | Seroussi et al. |
| 5,812,197 | A | 9/1998 | Chan et al. |
| 5,867,208 | A * | 2/1999 | McLaren ............... 725/139 |
| 5,974,197 | A | 10/1999 | Lee et al. |
| 6,005,622 | A | 12/1999 | Haskell et al. |
| 6,341,144 | B1 | 1/2002 | Haskell et al. |
| 7,221,761 | B1 * | 5/2007 | Deshpande et al. .......... 380/216 |
| 7,239,662 | B2 | 7/2007 | Horowitz et al. |
| 7,813,431 | B2 * | 10/2010 | MacInnis ................. 375/240.24 |
| 2007/0165959 | A1 * | 7/2007 | Takada ........................ 382/240 |

OTHER PUBLICATIONS

"Current and Future Trends in Multimedia Standards", Puri, et al, Multimedia Technology for Applications, 1998, Sheu et al, Editors, Chapter 1, pp. 3-35, IEEE Press Marketing, Piscataway, New Jersey.
Ploysongsang et al, DCT/DPCM Processing of NTSC Composite Video Signal IEEE Transactions on Communications, vol. Com-30, No. 3, Mar. 1982, USA, pp. 541-549.
"Improvements in DCT Based Video Coding", Puri et al, AT&T Laboratories, Visual Communications and Image Processing '97, Feb. 1997, San Jose, California, SPIE—The International Society for Optical Engineering, Bellingham, Washington.
"Invited Address: Video Coding Using the MPEG-1 Compression Standard", A. Puri, AT&T Bell Laboratories, Holmdel, New Jersey, 1992 SID International Symposium Digest of Technical Papers, May 1992, Society for Information Display, Playa del Rey, California pp. 123-126.
"Performance Evaluation of Nonscalable MPEG-2 Video Coding", Schmidt et al, AT&T Bell Laboratories, Holmdel, New Jersey, Visual Communications and Image Processing '94, Aggelos K. Katsaggelos Chair/Editor, Sep. 25-29, 1994, Chicago, Illinois, pp. 296-310, vol. 2308, Part One, SPIE—The International Society for Optical Engineering, Bellingham, Washington.
"Temporal Resolution Scalable Video Coding", Puri et al, AT&T Bell Laboratories, Holmdel, New Jersey, Proceedings, ICIP-94, Nov. 13-16, 1994, Austin, Texas, IEEE Computer Society Press, pp. 947-951, vol. II of III, Los Alamitos, California.
"SBASIC Video Coding and its 3D-DCT Extension for MPEG-4 Multimedia", Puri et al, AT&T Bell Laboratories, Holmdel, New Jersey, Visual Communications and Image Processing '96, Ansari et al Chairs/Editors, Mar. 17-20, 1996, Orlando, Florida, pp. 1331-1341, vol. 2727, Part Three, SPIE—The International Society for Optical Engineering, Bellingham, Washington.
"Video Coding Using the MPEG-2 Compression Standard", A. Puri, AT&T Bel Laboratories, Holmdel, New Jersey, Visual Communications and Image Processing '93, Haskell et al Chairs/Editors, Nov. 8-11, 1993, Cambridge, Massachusetts, pp. 1701-1713, vol. 2094, Part Three, SPIE—The International Society for Optical Engineering, Bellingham, Washington.
See et al, "Efficient Encoding of DC Coefficients in Transform Coding of Images Using JPEG Scheme", Signal Image and Video Processing, Jun. 11-14, 1991, vol. 1, No. Symp. 24, Institute of Electrical and Electronics Engineers, pp. 404-407, Singapore.
Haskell et al, Digital Video: An Introduction to MPEG-2, Chapter 9, pp, 183-229, Chapman & Hall, New York, New York, 1997.
International Organisation for Standardisation, ISO/IEC JTC 1/ SC 29/WG 11 N 3056, Information Technology—Coding of Audio-Visual Objects—Part 2: Visual : Amendment 1: Visual Extensions. Maui, Dec. 1999.
Irani M. et al. "Video Compression Using Mosaic Representations" Signal Processing. Image Communication, Elsevier Science Publishers, Amsterdam, NL, vol. 7, No. 4, Nov. 1995, pp. 529-552, XP004047098 ISSN: 0923-5965.
Itoh Y et al. "Universal Variable Length Code for DCT Coding" Image Processing, 2000. Proceedings. 2000 International Conference on Sep. 10-13, 2000, pp. 940-943, XP010530771, ISBN: 0-7803-6297-7.
Jeong J et al. "Adaptive Huffman Coding of 2-D DCT Coefficients for Image Sequence Compression" Signal Processing. Image Communication, Elsevier Science Publishers, Amsterdam, NL, vol. 7, No. 1, Mar. 1995, pp. 1-11, XP004047118, ISSN: 0923-5965.
Mathew R et al. "Efficient Layered Video Coding Using Data Partitioning" Signal Processing. Image Communication, Elsevier Science Publishers, Amsterdam, NL, vol. 14, No. 9, Jul. 1999, pp. 761-782, XP004170655, ISSN: 0923-5965.
Rabbani M et al. "An Overview of the JPEG 2000 Still Image Compression Standard" Signal Processing. Image Communication, Elsevier Science Publishers, Amsterdam, NL, vol. 17, No. 1, Jan. 2002, pp. 3-48, XP004326797, ISSN: 0923-5965.
Sima M et al. "MPEG-Compliant Entropy Decoding on FPGA-Augmented TriMedia/CPU64" Field-Programmable Custom Computing Machines, 2002. Proceedings. 10th Annual IEEE Symposium on Apr. 22-24, 2002, Piscathaway, NJ, USA, IEEE, Apr. 22, 2002, pp. 261-270, XP010619852, ISBN: 0-7695-1801-X.
"Flexible Macroblock Ordering," Wikipedia, retrieved from "http://en.wikipedia.org/wiki/Flexible_Macroblock_Ordering" on Jan. 4, 2012.
Wenger et al., "FMO: Flexible Macroblock Ordering," Joint Video Team (JVT) of ISO/IEC MPEG & ITU-T VCEG, 3rd Meeting: Fairfax, Virginia, USA, May 6-10, 2002, pp. 1-22 (JVT-C089).
Wenger et al., "FMO 101," Joint Video Team (JVT) of ISO/IEC MPEG & ITU-T VCEG, 4th Meeting: Klagenfurt, Austria, Jul. 22-26, 2002, pp. 1-11 (JVT-D063).
Wenger et al., "Scattered Slices: A New Error Resilience Tool for H.26L," Joint Video Team (JVT) of ISO/IEC MPEG & ITU-T VCEG, 2nd Meeting: Geneva, CH, Jan. 29-Feb. 1, 2002, pp. 1-11 (JVT-B027).
U.S. Appl. No. 60/314,413, filed Aug. 23, 2001.
"Handbrake: Introducing Instant Handbrake" Published Apr. 21, 2006; Internet Archive record from Feb. 2, 2007 (2 pages) http://web.archive.org/web/20070202022651/http://handbrake.mOk.org.

* cited by examiner

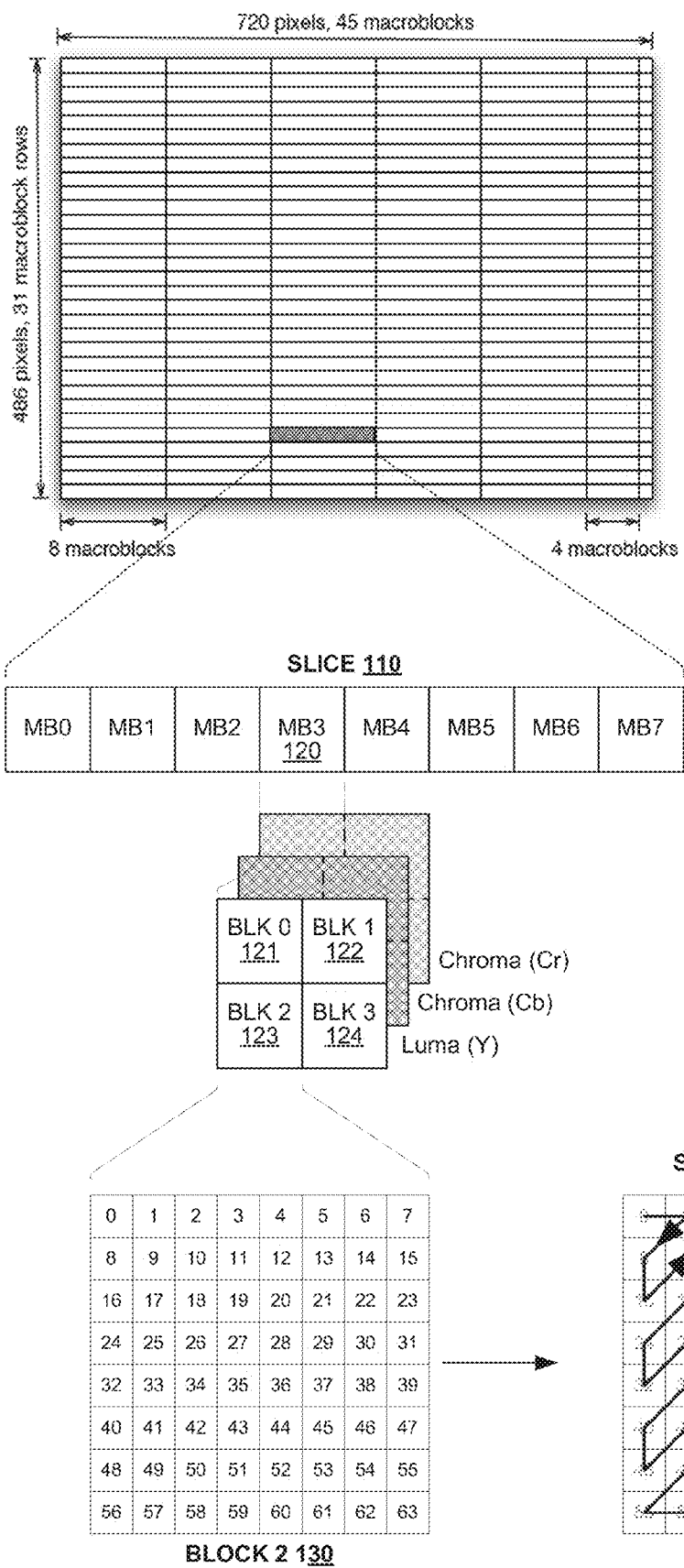

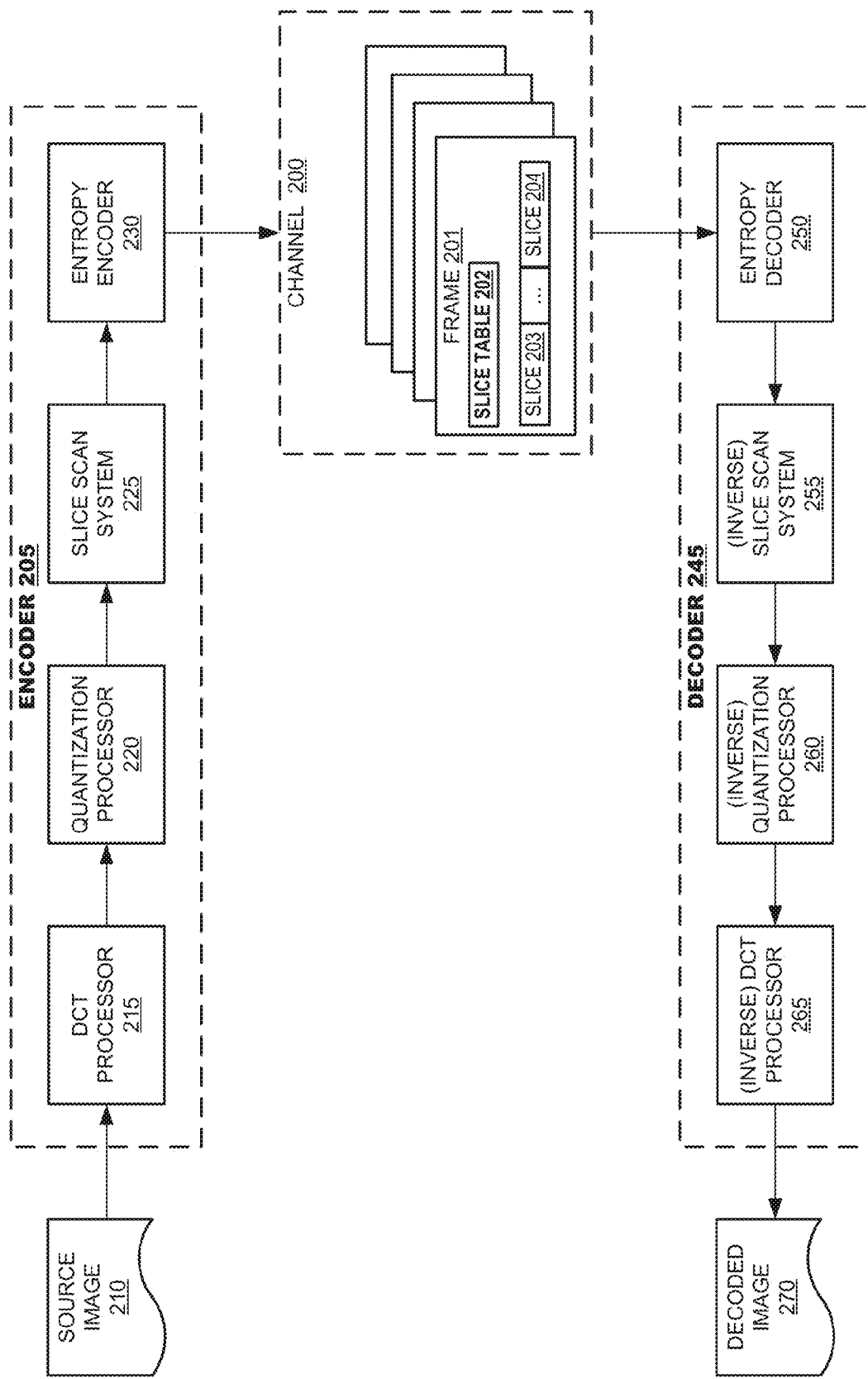

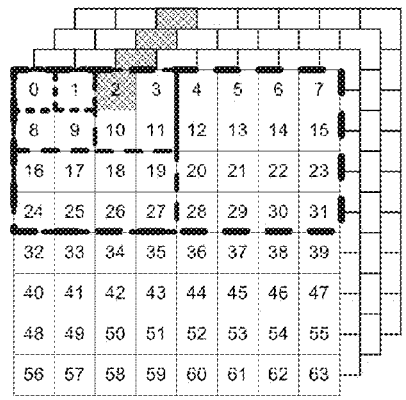
FIG. 3A
FIG. 3B
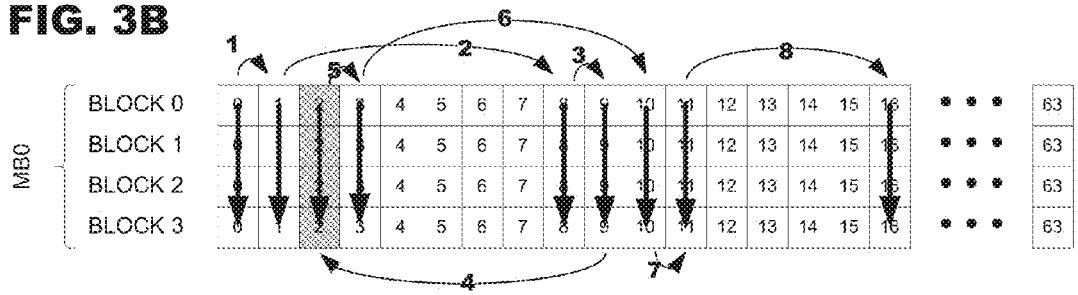
FIG. 3C
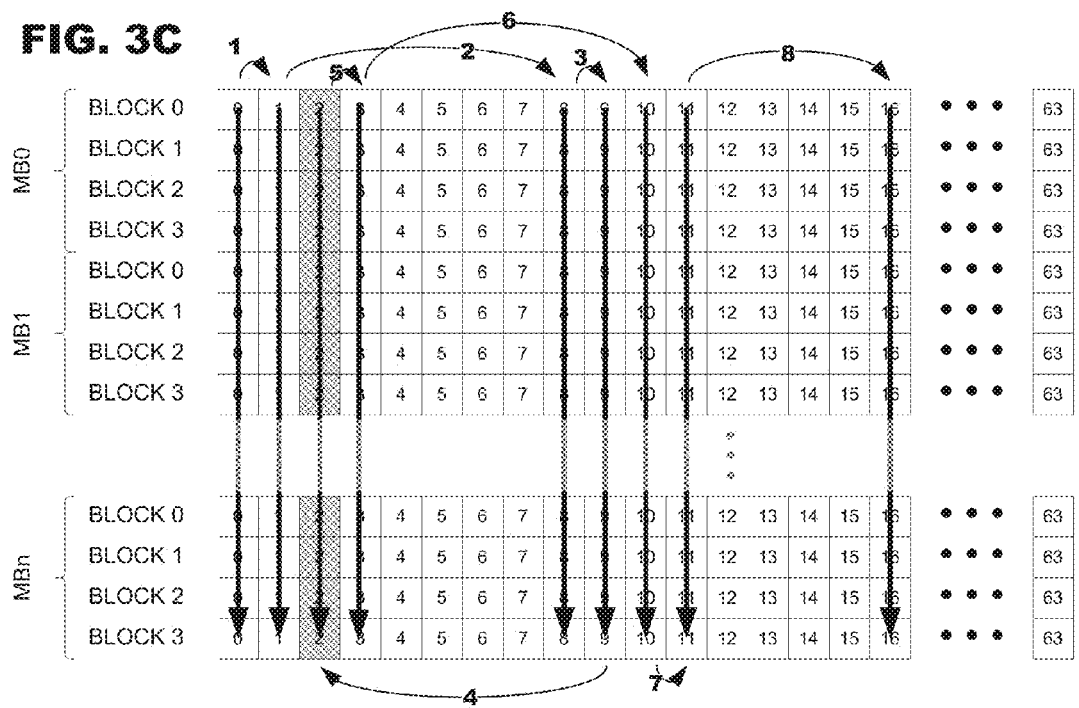

METHOD AND SYSTEM FOR VIDEO ENCODING AND DECODING

CROSS-REFERENCE TO RELATED APPLICATION

This application is a continuation of U.S. patent application Ser. No. 11/735,045, filed Apr. 13, 2007, which is set to issue on Nov. 12, 2013 with U.S. Pat. No. 8,582,656, and is incorporated herein by reference in its entirety.

BACKGROUND

Various encoding schemes are known for compressing video. Many such schemes are block transform based (e.g., DCT-based), and operate by organizing each frame of the video into two-dimensional blocks. DCT coefficients for each block are then placed in a one-dimensional array in a defined pattern, typically in a zig-zag order through the block. That is, each block is processed independently of each other block, and the DCT coefficients are grouped block-by-block. The coefficients are then encoded using standard run-length/differential encoding according to a predetermined scan direction; each encoded block is terminated by an end-of-block codeword. When decoding the video stream, the decoder searches for these codewords to identify when a new block is being decoded.

FIG. 1 illustrates composition of a picture 100 according to a conventional coding scheme. There, the picture 100 is organized into a plurality of slices 110 and macroblocks MB. Macroblocks conventionally correspond to 16×16 arrays of pixels. Slices may represent a collection of macroblocks arranged in a common macroblock row. The number of macroblocks per slice may vary.

Typically, macroblocks are composed of several smaller two-dimensional blocks 121-124. Blocks are generated corresponding to luminance and chrominance video components within the pixel data. Several variations are known. In a 4:2:2 video stream, each macroblock contains four luma (Y) blocks, two first chroma (Cb) blocks, and two second chroma (Cr) blocks. Similarly, in a 4:4:4 video stream, illustrated in FIG. 1, each macroblock contains four Y blocks 121-124, four Cb blocks, and four Cr blocks. The component samples (typically 64) are numbered left-to-right across the picture. The exemplary block 130 shown in FIG. 1 includes transform coefficient positions numbered 0-63.

The numbering shown of the positions in block 130 is for identification, and generally will not correspond to the order in which DCT coefficients are scanned during an encoding process. A scan direction 140, also shown in FIG. 1, traverses each block 130 and codes quantized DCT coefficients as a plurality of non-zero levels and runs of zeros. In practice, the quantization process divides DCT coefficients by a quantization step size, reducing each level to be coded. Many DCT coefficients are quantized to zero, which generally contributes to long runs of zeros during the scan process and contributes to coding efficiency.

The resulting bitstream would then contain all the encoded coefficients from the first block in order, followed by all the coefficients from the second block in order, etc. That is, a typical encoding scheme groups encoded data by block. A decoder therefore must process each block sequentially as it is received before continuing to the next block.

Currently-known encoding/decoding schemes may not be suitable for every application. For example, when an encoded video stream is to be decoded for a display smaller than the original size of the video, the decoder may have to decode each portion of each frame even though some data will be discarded to re-size the video for the smaller display. Furthermore, the encoding and decoding processes are not easily parallelized. For instance, since the start of each encoded portion of the bitstream must be marked to allow a decoder to identify the beginning of each portion, the bitstream must be scanned for markers to be decoded in parallel.

Thus there is a need in the art for a coding/decoding scheme that allows for video data to be efficiently resized for displays of different size than the original image. There is also a need for a coding/decoding scheme that can be parallelized to allow for more efficient processing of image data.

BRIEF DESCRIPTION OF THE DRAWINGS

FIG. 1 shows a schematic representation of picture decomposition for traditional coding schemes.

FIG. 2 shows an encoder, decoder, and data channel according to an embodiment of the present invention.

FIG. 3A shows an exemplary grouping of coefficient positions according to an embodiment of the present invention.

FIG. 3B shows an exemplary scan method according to an embodiment of the present invention.

FIG. 3C shows an exemplary scan method according to an embodiment of the present invention.

DETAILED DESCRIPTION

Figure 4A:
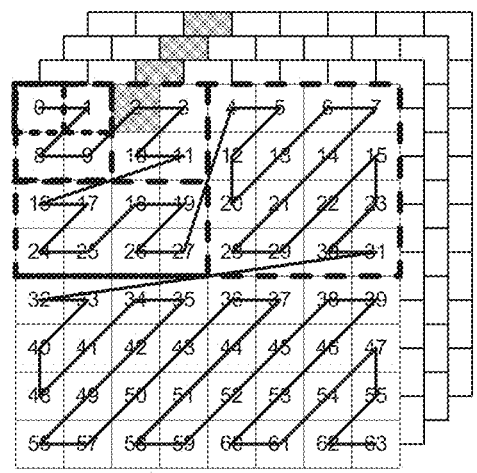
FIG. 4A shows an exemplary scan direction according to an embodiment of the present invention.

Methods and systems are provided for encoding and decoding a video stream. Each picture in a video stream can be divided into slices, each of which contains a contiguous row of macroblocks; each macroblock contains multiple blocks corresponding of all video components to the same spatial location. The blocks within each slice can be used as the basis for encoding the picture. By encoding multiple blocks in a single process using certain scan patterns, the video stream can efficiently be converted for displays of varying sizes. The encoded bitstream can include a slice table to allow direct access to each slice without reading the entire bitstream. Each slice can also be processed independently, allowing for parallelized encoding and/or decoding.

Exemplary systems for encoding and decoding a video stream are shown in FIG. 2. A source image 210, such as a single picture from a video stream, is received by an encoder 205. A picture refers to, for example, a progressive video frame or a single field of an interlaced video frame. A discrete cosine transform (DCT) processor first calculates DCT coefficients for the picture to map from the spatial domain of the picture to a frequency domain. The DCT coefficients may be calculated conventionally. For example, for an image N pixels wide by N pixels high, the DCT coefficient may be calculated as $$DCT(u, v) = \frac{2}{N} C(u)C(v) \sum_{x=0}^{N-1} \sum_{y=0}^{N-1} f(x, y) \cos\left(\frac{\pi u}{2N}(2x+1)\right) \cos\left(\frac{\pi v}{2N}(2y+1)\right)$$

where $$C(u) = \frac{1}{\sqrt{2}}$$

for u=0 and 1 otherwise, DCT(u,v) is the coefficient in row u, column v of the DCT matrix, and f(x,y) is the relevant intensity of the pixel in row x, column y of the source image. Other algorithms and/or transforms can be used.

A quantization processor 220 receives the DCT coefficients and quantizes them according to any appropriate quantization formula. An exemplary quantization process is the quantization process used in the MPEG2 codec. Other quantization processes may be used.

A slice scan system 225 receives the quantized DCT coefficients and orders them according to a multi-block scan pattern. In the present system each picture in the video stream is processed using multiple blocks of the same video component type, instead of block-by-block. Thus, Y, Cb and Cr components can be coded in parallel, independent processes. For example, when each slice is scanned, all the Y coefficients at the same location (position 0, 1, 2, etc.) in each block can be grouped together and subsequently encoded. Conceptually, the quantized transform coefficients of each block can be considered as members of a two-dimensional array in which the coefficients of a single block occupy a row of the array and the array contains as many rows as blocks to be scanned. In practice, various methods and systems may be used to store the scanned coefficients and they may not specifically be stored in an array structure, so long as the desired access order of coefficients is maintained. For example, the quantized coefficients can be stored in a memory array or any other convenient structure, and in any order, then accessed in the desired order. For convenience, the quantized coefficients will be described herein as stored in a quantized DCT array or other transform array, though it will be understood that other storage and/or access systems and methods can be used.

After the quantized transform coefficients have been scanned, an entropy encoder 230 may encode the coefficients into a bitstream and output them to a channel 200. The bitstream contains encoded data for a series of frames 201, each of which is the portion of the bitstream containing the encoded data for a single picture for a progressive frame, or two pictures (top and bottom field pictures) for an interlaced frame. A picture can include a slice table 202 describing the position of slice data 203, 204 for all the slices in the frame. The bitstream can thus contain all the 0-position (DC) coefficients from all the blocks in the first slice, followed by all the coefficients from the first position (AC) for all the blocks in the first slice, etc. An exemplary structure for the bitstream is described in further detail below.

The channel 200 can be an optical, electrical or magnetic computer-readable storage medium, or a communication channel formed by wired or wireless communication systems. Exemplary channels include hard drive memory, flash memory, floppy disk memory, optically-encoded memory (e.g., a compact disk, DVD-ROM, DVD±R, CD-ROM, CD±R, holographic disk, high-definition storage media), thermomechanical memory, or any other type of computer-readable (machine-readable) storage medium. It can also be any wired or wireless system, such as used in computer networks, multimedia systems, and the like.

A decoder 245 may decode the bitstream received via the channel 200. In general, the decoder may contain elements that can perform the inverse operations of those described with respect to the encoder 205. For example, the decoder 245 may contain an entropy decoder 250, an inverse slice scan system 255, an inverse quantization processor 260, and an inverse DCT processor 265. When the decoder 245 processes the bitstream, a decoded image 270 is produced. The decoded image 270 may be displayed on a screen or other display that is smaller than the source image 210. In such a situation, the decoder may make use of the slice table 202 to decode only a portion of each slice, thus efficiently down-sizing the image for display on the smaller screen or other display device. Multiple decoders also may be used to decode the bitstream in parallel, since each slice is independent of every other slice.

Alternatively, the encoder and decoder may be provided as remote processing systems, in which the decoder operates independently of the encoder. Indeed, in many applications, video coding may occur as an "encode once, decode many" processing system in which a content provider encodes video data once and distributes multiple copies of the coded data to multiple decoders (not shown) via multiple channels (also not shown).

The elements of the encoder 205 and decoder 245 can be realized in hardware, software, or any combination of hardware and software. In some cases, elements can be combined into a single structure or component that performs multiple functions or a combination of functions. For example, a transform processor such as DCT processor 215 and a quantization processor 220 can be combined into a single element that calculates and quantizes transform coefficients.

FIGS. 3A-3C illustrate an exemplary scan order for a progressive frame. In FIG. 3A, macroblock data are shown as arranged into a three-dimensional array in which like-kind coefficients are aligned (e.g., all coefficients at positions 0, 1, 2, . . . , 63 are aligned with each other). In FIG. 3B, the same data is reduced to a two-dimensional structure in which data of each block occupy a single row and columns maintain alignment of like-kind coefficient positions. FIG. 3B illustrates an example in which the arrays stores data of only four blocks of a common macroblock. FIG. 3C illustrates another embodiment in which the array stores data of all blocks of a slice (MB0-MB$_n$) for a single video component (e.g., luma).

According to an embodiment, a slice scan system may traverse coefficients of multiple blocks in a single coding operation. The scan starts at a first coefficient position (say, position 0) and scans across all blocks (say, blocks 0-3 of FIG. 3B) at that position. The scan advances to a next coefficient position (say, position 1) and scans across all blocks at that position. The scan incrementally advances to successor positions (say, positions 8, 16, 9 and 2 in order) and, at each scan position, the slice scan system scans across all blocks in each of the positions before advancing to the next successor positions.

During operation, because the array stores quantized transform coefficients, it is likely that the values at many of the coefficient positions will be zero. If there is significant redundancy in image content among the blocks in the arrays of FIG. 3B or FIG. 3C, then the zero valued coefficients are likely to be clustered among many columns of the array. Thus, the slice scan process coupled with run-length coding may yield improved coding efficiency over a block-based scan system because the slice scan system will yield much longer runs of zero valued coefficients.

As a specific example, the blocks illustrated in FIG. 3B may be the luma component blocks of a macroblock. The transform coefficients for each block at each component position 0-63 are stored in a transform coefficient array in the order shown in FIG. 3B. An entropy encoder can then encode the coefficients by processing coefficients at the same position in each block together. That is, the coefficients in the first column (the 0-position coefficients) may be processed first, followed by the coefficients in the second column (position 1), and so on. Generally, low-frequency coefficients may be processed first.

If the picture for which blocks are scanned is a progressive frame, an exemplary order in which the coefficients are scanned into the row is: 0, 1, 8, 9, 2, 3, 10, 11, 16, 17, 24, 25, 18, 19, 26, 27, 4, 5, 12, 20, 13, 6, 7, 14, 21, 28, 29, 22, 15, 23, 30, 31, 32, 33, 40, 48, 41, 34, 35, 42, 49, 56, 57, 50, 43, 36, 37, 44, 51, 58, 59, 52, 45, 38, 39, 46, 53, 60, 61, 54, 47, 55, 62, 63. The first 9 coefficient positions scanned are illustrated with arrows in FIG. 3B.

FIG. 4A illustrates this exemplary scan direction. Scanning begins in the upper-left portion of the block, with positions 0->1->8->9, i.e., the lowest-frequency coefficients. The use of only a sub-set of coefficients can allow for spatial and/or quality scalability. For example, if only one coefficient is encoded (or later, decoded), a $\frac{1}{64}$-size image may be obtained. If only two coefficients are scanned, a $\frac{1}{32}$-size image may be obtained. If only the first four coefficients are scanned, a $\frac{1}{16}$-size image may be obtained. Similarly, $\frac{1}{8}$-size, $\frac{1}{4}$-size, $\frac{1}{2}$-size images may be obtained if only the first eight, sixteen, 32 coefficients are scanned, respectively. Such downsizing may be referred to as spatial scalability. In an embodiment, quality (or PSNR) scalability also may be achieved with this scan order in a similar manner. For example, a full-size image can be decoded even if only the first few coefficients are decoded; in such a process, the decoder can use a 0 value for positions that are not decoded and thus decode the image at full size. The decoded full-size image has a lower quality because some high frequency components are missing. The portions that can be scanned to obtain a downsized or reduced quality image are shown with dotted outlines. As previously described, the scan order can include like-kind coefficient positions from multiple blocks in a single coding operation.

Figure 4B:
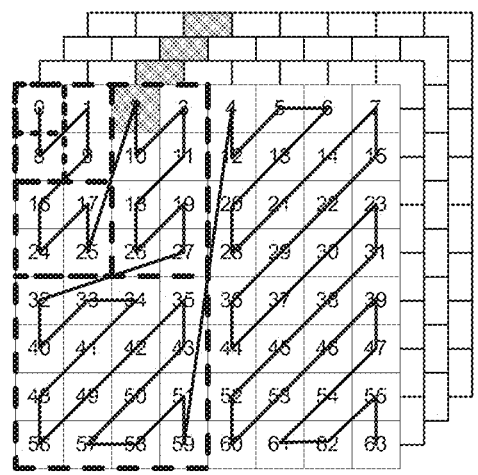
FIG. 4B shows an exemplary scan direction according to an embodiment of the present invention.

A different scan order may be used, such as when the picture is a single field from an interlaced frame. For example, an exemplary order for scanning coefficients from a single field of an interlaced frame is 0, 8, 1, 9, 16, 24, 17, 25, 2, 10, 3, 11, 18, 26, 19, 27, 32, 40, 33, 34, 41, 48, 56, 49, 42, 35, 43, 50, 57, 58, 51, 59, 4, 12, 5, 6, 13, 20, 28, 21, 14, 7, 15, 22, 29, 36, 44, 37, 30, 23, 31, 38, 45, 52, 60, 53, 46, 39, 47, 54, 61, 62, 55, 63. FIG. 4B illustrates this scan direction. As with the scan direction described with respect to FIG. 4A, down-sized images may be obtained as shown by the dotted outlines, and multiple blocks may be processed in a single operation. The scan order in FIG. 4B can also be used for other configurations, such as for a progressive frame if the $\frac{1}{2}$-size, $\frac{1}{8}$-size, and $\frac{1}{32}$-size images are to be in a different orientation (for example, portrait vs. landscape).

Although the examples described herein refer to exemplary macroblocks that are 16 pixels wide by 16 pixels high, other macroblock dimensions may be used. In an embodiment, a picture having dimensions that are not multiples of a macroblock size used by an encoding scheme may be processed using standard-size macroblocks, with macroblocks in the last column and/or row extended for encoding purposes. The picture width and height may be sent in a picture header to inform a decoder of the picture dimension. Other information may be included in various headers in the encoded bitstream. For example, the exemplary picture illustrated in FIG. 1 is 486 pixels high, with 31 macroblock rows. For such a picture, 30 rows of 16×16 pixel macroblocks may be used, and macroblocks in the final row may be extended to 16×16 pixels for encoding.

As shown in FIGS. 4A-4B, a down-sized (i.e., scaled-down) or reduced quality version of the image may be obtained by only considering a subset of coefficients when using either of the exemplary scan orders or a similar scan order. The down-sized image may be obtained during encoding, if only the initial coefficients are scanned, or during decoding, if only the bitstream portions corresponding to the initial (lower-frequency) coefficients are decoded. This scaling-down process and methods for decoding only a portion of the encoded image are described further below.

Furthermore, in a lossy environment (such as a channel with a high channel error rate), the initial (lower-frequency) coefficients may be transmitted with higher priority than the later (higher-frequency) coefficients. Since initial coefficients are decodable independent of the later coefficients—even if the later coefficients are lost or subject to error in the channel—a decoder may still decode a picture of acceptable visual quality despite the high channel error rate. In contrast, traditional video coding schemes generally are more susceptible to degraded visual quality when exposed to error-prone channels.

In the exemplary scan orders described above, the coefficient in the first column of each row is the DC coefficient of the corresponding block, and coefficients in the other columns of each row correspond to the AC coefficients. Generally, the coefficients will be scanned such that low-frequency coefficients are scanned into earlier positions. As discussed further below, this can allow for efficient decoding and/or re-sizing of the video.

The scan process described above can be repeated for each set of blocks in each slice, such as for each set of video component blocks in each macroblock within the slice. It can then be repeated for each slice in the picture. Notably, since no slice is dependent on any other slice, the scan process may be used in parallel processing systems where different processors code slices independently of the other processors.

An entropy encoder, such as the encoder 230 illustrated in FIG. 2 can encode the coefficients scanned by the slice scan system into a bitstream stored on or carried by a channel 200. Since multiple blocks are scanned at the same time, run level coding may be performed more efficiently since generally runs of similar lengths are grouped together and can be efficiently encoded, which is not the case for traditional block-based encoding schemes. As such, it may be useful to use adaptive codebooks to perform run-length encoding. An adaptive codebook can use coding algorithms suited for large values when long runs are encountered, and algorithms suited for smaller values when shorter runs are encountered. Thus the combination of multi-block encoding and adaptive codebooks can allow for realization of efficient coding for multiple blocks from a slice.

The use of adaptive codebooks and exemplary codebooks that may be used are further described in co-pending U.S. application Ser. No. 11/734,938, filed Apr. 13, 2007, the disclosure of which is incorporated by reference in its entirety.

Various encoding schemes can be used by the entropy encoder. Typically, a system of run level coding may be used.

An exemplary encoding scheme for the DC coefficients begins by mapping the DC coefficient of the first block in the slice ($DC_0$) to $S_0 = S(DC_0)$, where $S(n)$ is defined as:

$$S(n) = \begin{cases} 2|n|, & n \geq 0 \\ 2|n| - 1, & n < 0 \end{cases}$$

$S_0$ is then mapped to a variable-length codeword using an adaptive codebook. The quantized DC coefficients for the other blocks in the slice, $DC_1 \ldots DC_n$, where n is $1 \ldots N-1$ are encoded differentially. In the exemplary encoding scheme, N is 4M (for a luma component or a 4:4:4 video stream chroma component) or 2M (for a 4:2:2 video stream chroma component), where M is the number of macroblocks. In general, a slice may contain any number of macroblocks. In some cases, the possible number of macroblocks in a slice may be restricted to allow for improved decoding performance. For example, M may be restricted to be a power of two, i.e., $M=2^m$, where m is an integer.

For each coefficient, the following values are defined:

$$\Delta_i = DC_i - DC_{i-1}$$
$$\Delta_i' = \begin{cases} -\Delta_i, & \Delta_{i-1} < 0 \\ \Delta_i, & \Delta_{i-1} \geq 0 \end{cases}$$

In this exemplary scheme, the initial value $\Delta_0$ is defined to be 3, though other values may be used. $\Delta_i'$ is then mapped to $S_i = S(\Delta_i')$, and $S_i$ is mapped to a variable-length codeword using an adaptive codebook based on the value of $|\Delta_{i-1}|$.

The entropy encoder 130 can then encode the AC coefficients at each position of each block in the slice. Typically, the coefficients will be encoded sequentially, i.e., all the first-position AC coefficients in the slice are encoded, followed by all the second-position AC coefficients in the slice, and so on. It should be noted that the AC position does not necessarily correspond, and generally does not correspond to the numbered position described with reference to FIG. 3A. Instead, the AC position is determined by the column in which a coefficient occurs in the transform coefficient array resulting from the process described with respect to FIGS. 3B and 3C. Thus, for example, when using the exemplary progressive frame scan order described above, coefficients corresponding to the 8-position video component will be the second-position AC coefficients. Since each slice is independent, this process may be parallelized to achieve higher encoding performance with reduced encoding time. In an exemplary encoding scheme, the AC coefficients are first run length encoded and then variable-length encoded.

An exemplary encoding scheme for the AC coefficients begins with the first entry of the second column of a quantized transform coefficient array (i.e., the first AC coefficient of the first block of the slice). The number of consecutive zero values R in the column is counted; if the end of the column is reached the process continues at the beginning of the next column. The count is stopped when a non-zero value L is encountered or when the array is exhausted. The run length R and level L can then be encoded using various encoding schemes. For example, if the count for a run $R_i$ is terminated because a non-zero L is reached, $R_i$ can be mapped to a variable-length codeword using a table defined by the previous run $R_{i-1}$ ($R_{i-1}$ can be defined for the first run $R_0$, typically as $R_{i-1}=4$). In that case the value $|L|-1$ is mapped to a variable-length codeword using a table determined by the previous value of $|L|$ (where the initial "previous" level is defined, typically to be 2). A bit can be appended to represent the sign of L. The run counting process is then restarted at the coefficient after the terminating coefficient. If the first coefficient to be counted for a run is non-zero, the run length is 0. If the count for a run is terminated because the array is exhausted, the final run (i.e., the one exhausting the table), may not be encoded. When such an encoding scheme is used, it may be desirable for decoders to be aware that the bitstream for each quantized DC coefficient array may end without explicitly including all the coefficients in the array.

The entropy encoder can repeat the above-described process of encoding transform coefficients for each slice in the picture. The exemplary encoding scheme or any other encoding scheme may be used. Generally, the coefficients for each block position in the slice will be encoded in the order described, i.e., where low-frequency coefficients are encoded first, though variations are possible.

Transforms other than the specific transform described may be used. Typically, transforms are used to convert the image data into a frequency domain. For example, the discrete Fourier transform, fast Fourier transform, wavelet transforms, modified DCT, and/or discrete sine transforms may be used. In general, any transform that converts a finite number of pixel values to a finite number of transform coefficients may be used. Variants on the DCT described herein also may be used.

Figure 5:
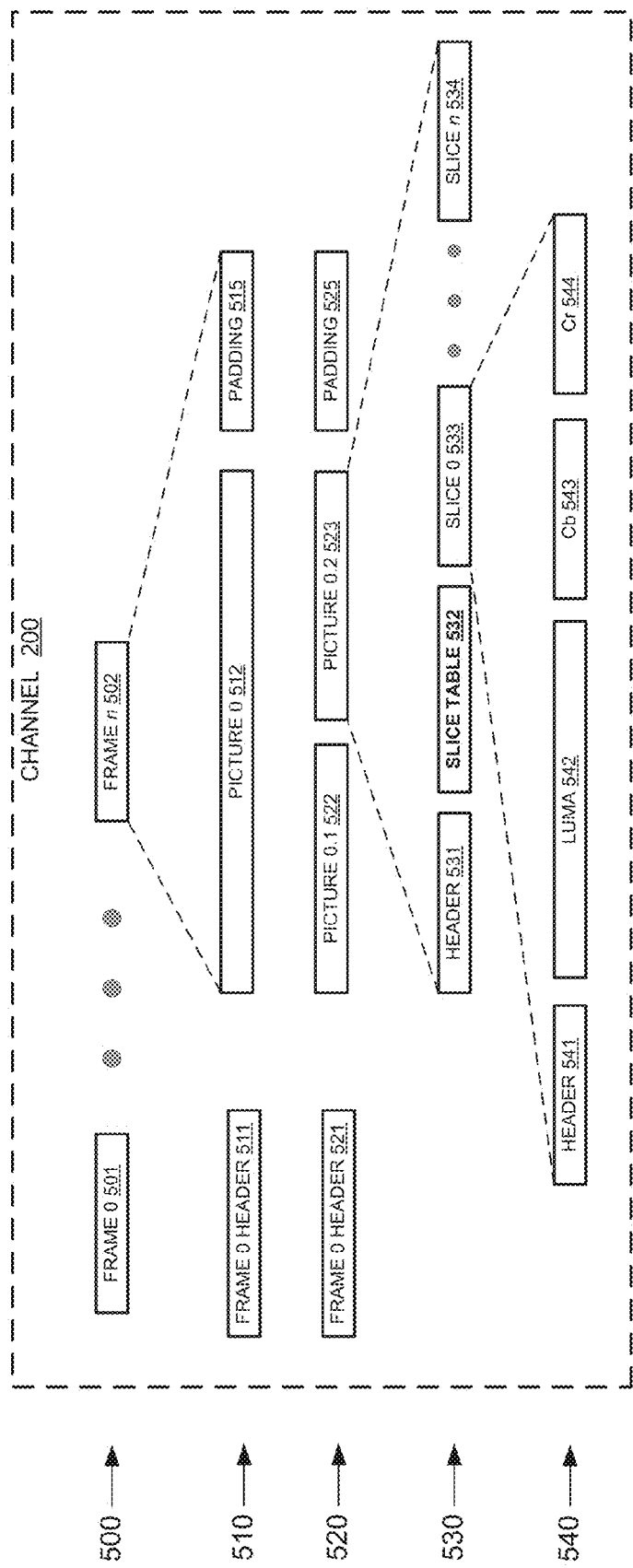
FIG. 5 shows the structure of a bitstream stored in a data channel according to an embodiment of the present invention.

The bitstream produced by the entropy encoder will now be described with respect to FIG. 5. At a high level, the bitstream contains a sequence 500 of frames 501, 502. Each frame can include one or more pictures. For example, if the source video stream is a progressive video, each frame may include a single progressive picture 512. If the source video is an interlaced video, each frame may include the interlaced fields 522, 523 that make up a single video frame. A frame 510 can contain multiple components, such as a header 511, a picture 512, and, if necessary or desired, padding 515. The padding 515 may be used to cause each frame 501, 502 in a bitstream to be the same length. As previously described, a frame 520 also may contain multiple pictures 522, 523, in addition to a header 521 and/or padding 525.

Each picture 530 can be defined by data corresponding to the slices created when the bitstream is created. Typically, a picture can be defined by a header 531, a slice table 532, and a plurality of slices 533, 534. The slice table can store information about the size of each slice, the location of the slice within the bitstream, and other similar information. A decoder can use this information to jump directly to any slice within the bitstream, which can be useful, for example, when the video stream is decoded for use on a display smaller than the size of the original, or for use in applications where quality can be traded for decoding speed. In such a situation, the decoder may only need to decode portions of each slice, generally only those portions containing the low-frequency coefficients. By using the slice table, the decoder can decode the desired portion of a slice, determine the location of the next slice, and jump to the next slice without having to decode the remaining, unnecessary portion of the first slice.

The slice table can also allow a video stream to be encoded, or a bitstream to be decoded, in a parallel fashion. Since each slice is independent of the other slices in the bitstream, several encoders or decoders can be used simultaneously. For example, when decoding a bitstream, several decoders can decode different slices in parallel, and the resulting image/video data can be assembled after the appropriate number of slices is decoded. No decoder is delayed waiting for any other decoder, since the decoding of each slice is independent of the decoding of any other slice.

Each slice 540 can contain various data, such as a header 541 and image data information. For example, a slice may contain luma (Y) data 542, blue chroma (Cb) data 543, and red chroma (Cr) data 544. Other image data also may be stored in each slice.

The use of a slice table can allow a decoder to efficiently decode a video stream for use on a display smaller than the size of the source video stream. For example, if the exemplary scan order described above is used, a ¹⁄₁₆th size image can be obtained by decoding only the first four coefficient positions within each slice (i.e., 1, 2, 8, 9). Similarly, a ¼th size image can be obtained by decoding only the first 16 coefficient positions within each slice, and a ½ size image by decoding only the first 32 coefficient positions within each slice. It will be understood that other scan orders can be used while still obtaining similar results. In general, if each slice is loaded with lower-frequency coefficients closer to the front, various output sizes can be obtained by decoding only a desired proportion of the coefficients within each slice of the bitstream. This process can also be parallelized, since each processor or process can decode separate slices without requiring information from other processors or processes associated with other slices.

It will be understood that although the bitstream is described as containing various frames, pictures, slices, and other elements of a video stream, these elements refer to encoded data, such as that created by the encoder 205 described with respect to FIG. 2, and do not refer to, for example, the original pictures that make up a source video stream.

Figure 6:
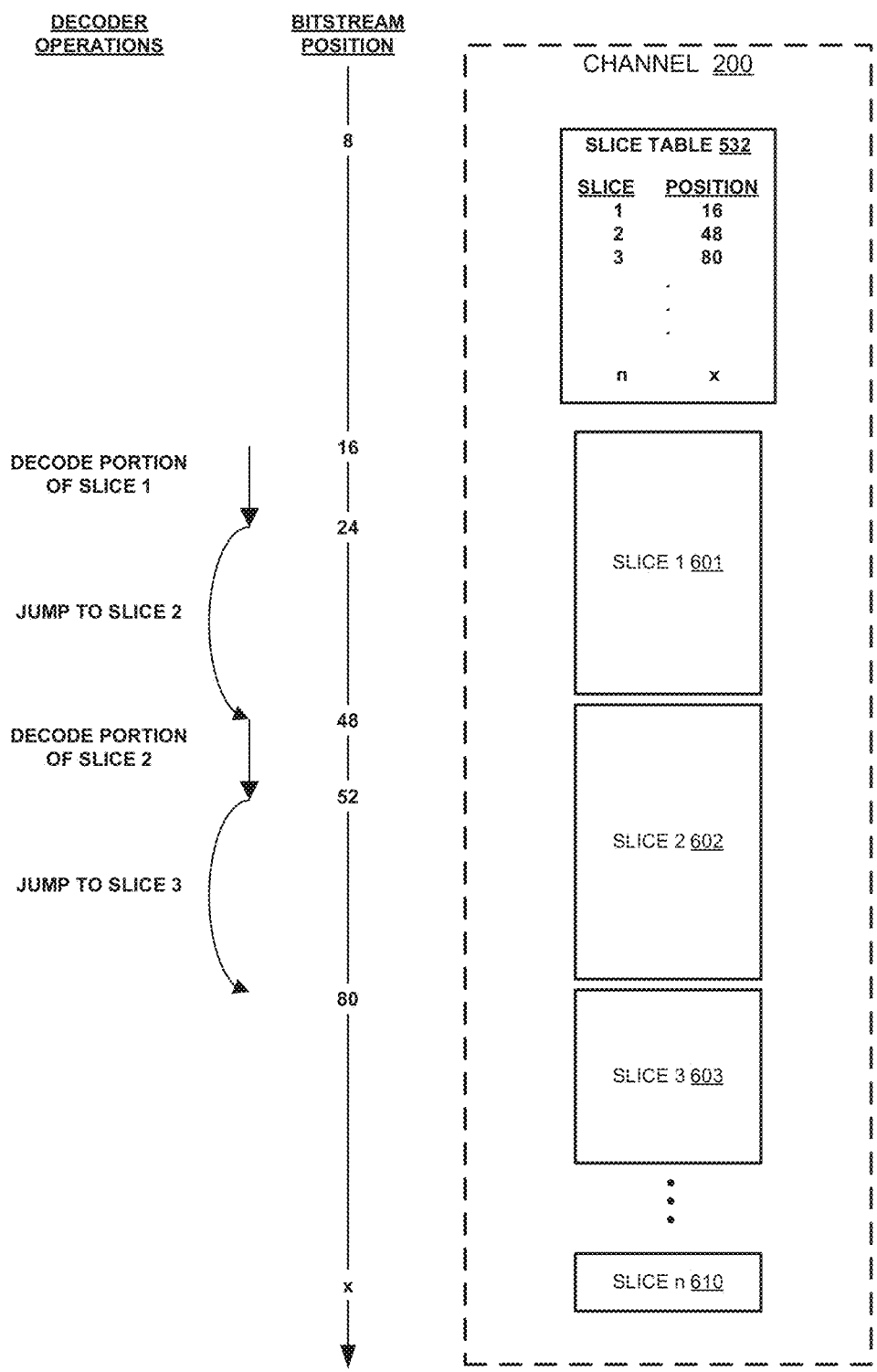
FIG. 6 shows an exemplary slice table according to an embodiment of the present invention.

FIG. 6 shows an exemplary channel containing a slice table according to an embodiment of the invention. As previously described, the encoded data can be stored or transmitted on a channel 200. The data stored on a channel can be identified by its position in the channel ("bitstream position"). For example, if the channel is a DVD or other physical storage medium, the bitstream position may identify the physical location of the data on the storage medium. Similarly, if the channel is a wired or wireless communication channel, the bitstream position can identify where in the transmitted data the data occurs. A slice table 532 can be used to store the bitstream position of each slice. In the exemplary channel shown in FIG. 6, the slice table 532 occurs at bitstream position 8, slice 1 occurs at position 16, slice 2 at position 48, slice 3 at position 80, and slice n at position x. When a decoder processes the data stored on the channel 200, it can use the slice table 532 to identify the location of a next slice to be decoded. The next slice to be decoded may not be the next slice in order in the channel, but can be any slice in the channel. For example, the decoder may begin by reading and storing the slice table 532. It may then decode a first slice or a portion of a first slice 601, such as the data stored at bitstream positions 16-24. After decoding the desired portion of the first slice, the decoder may consult the slice table 532 to determine the bitstream location of the next slice 602, and then continue processing at the beginning of that slice (i.e., bitstream position 48). Thus the slice table can allow the decoder to "jump" from one slice to another without needing to decode or process the entirety of each slice. After the decoder has processed the desired portion of the second slice (such as that portion stored at bitstream positions 48-52), it can then consult the slice table to jump to the next slice 603.

Thus, the use of a slice table can allow for efficient decoding of a portion of a video stream, such as to down-size the video stream.

The slice table may include information other than that specifically shown in FIG. 6. For example, it may include the size of each slice or component stored in the channel, such as the length of data corresponding to each Y, Cr, and/or Cb component for the slice. It also may include standard header information such as a vendor identification, or other data to be used by a decoder when processing data stored on the channel.

Figure 7:
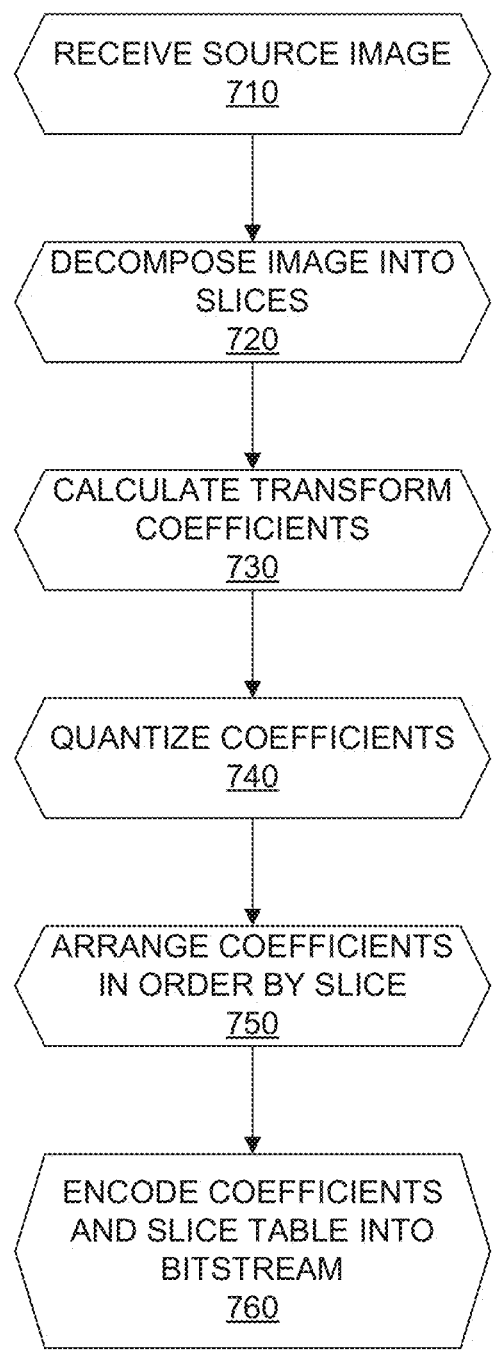
FIG. 7 shows a method for encoding a video stream according to an embodiment of the present invention.

FIG. 7 shows an exemplary method for encoding a video stream. A source image can be received by an encoder 710 and decomposed into slices 720. As previously described, a slice is a contiguous collection of macroblocks sharing the same macroblock row. For each slice, transform coefficients can be calculated 730, quantized 740, and scanned into a predetermined order 750 for each slice or other set of blocks within the slice, as previously described. The coefficients for each slice are then encoded into a bitstream 760, which can then be transmitted using various computer-readable media. A slice table can also be encoded into the bitstream, to allow for parallelization and other efficient decoding schemes. Generally, the bitstream will be transmitted to a decoder, where it can be decoded using an inverse process as previously described with respect to FIG. 2. Each slice can be processed independently from each other slice, allowing for parallel processing and encoding of the slices.

Figure 8:
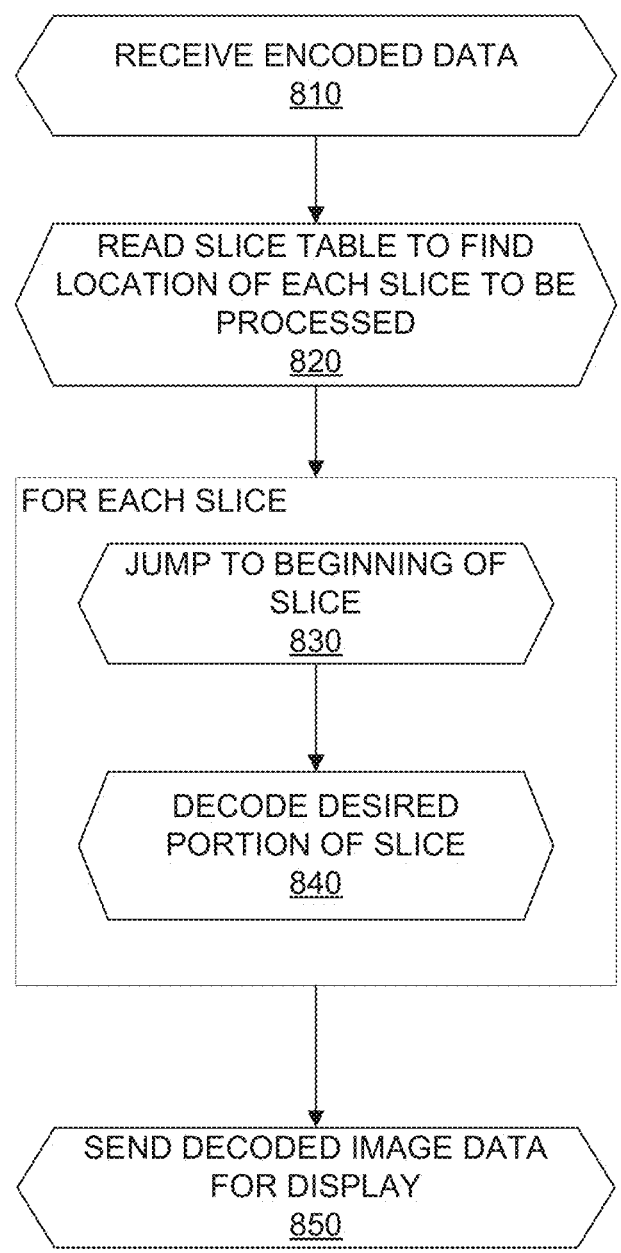
FIG. 8 shows a method for decoding a video stream according to an embodiment of the present invention.

FIG. 8 shows an exemplary method for decoding a video stream. An encoded bitstream can be received by a decoder 810. As previously described, the bitstream may be arranged using various structures, such as by grouping encoded data into frames representing one or more pictures of a source video. A decoder can read a slice table in the bitstream to determine the location of a slice within the bitstream 820. The slice table may include information such as the size and location of each slice in a portion of the bitstream. For example, when the bitstream is transmitted as a series of frames, each picture within the frame may have a slice table. When the decoder has located a slice to be decoded, it can jump to the beginning of the slice 830. That is, the decoder can begin accessing the slice at the beginning, without having to read and/or process each part of the bitstream before the beginning of the slice. The decoder can then decode the slice or a portion of the slice 840. For example, the decoder may only need to decode a portion of the slice at the beginning, such as when only a small portion of the lowest-frequency coefficients in the slice are required. This may be the case when a reduced-size or reduced-quality version of the source video is desired.

As previously described, decoding the encoded data can include performing inverse operations corresponding to the operations performed by an encoder to encode source image data. If there are additional slices to be decoded, the decoder can use the slice table to determine the location of another slice to be decoded. That is, the decoder can access the beginning of the next slice without first processing the rest of the first slice and/or any intervening data in the bitstream. In some cases, the decoder or a processor within the decoder may skip slices when jumping from one slice to the next, such as where multiple processors are used to decode slices in parallel. The decoder can send decoded image data to a display system after each slice has been decoded, or after some number of slices have been decoded.

Run-length decoding may be performed as a reverse operation of the run-length coding described with respect to FIGS. 3A-3C. In an embodiment, since many of the run-length coded values are zero, performance may be improved by initializing a decoded coefficient array by filling the array with zeros. During run-length decoding, the appropriate entries can then be replaced with non-zero levels. To perform the level replacement, the total number of entries accounted for, $n_a$, is tracked, beginning after the DC coefficients have been decoded (i.e., when $n_a$=N, and N is typically 4M or 2M for M macroblocks in the slice as previously described). Thus $n_a$ has an initial value equal to the number of rows in the conceptual array. When a run/level pair (R, L) is decoded, $n_a$ is first incremented by R to skip the zero entries, which indicates where the associated level belongs in the decoded coefficient array. The running count $n_a$ can be converted to array row and column values of $n_a$ mod N and floor($n_a$/N), respectively. The non-zero level L is then placed in the appropriate array entry and $n_a$ incremented by 1, and the process repeated for the next run/level pair.

In an embodiment, the number of macroblocks in a slice, M, may be restricted to allow for more efficient decoding. For example, M may be restricted to be a power of two, i.e., $M=2^m$ where m is an integer, which in turn causes N to be a power of two when N is 2M or 4M as previously described. In that case, floor ($n_a$/N) may be calculated using a right-shift operation, and $n_a$ mod N may be calculated using a mask AND operation. This can reduce processing time, and hence decoding time, since a decoder can determine the array position without carrying out the division and remainder operations that may otherwise be required.

The various systems and components described herein may each include a storage component for storing machine-readable instructions for performing the various processes as described and illustrated. The storage component may be any type of machine readable medium (i.e., one capable of being read by a machine) such as hard drive memory, flash memory, floppy disk memory, optically-encoded memory (e.g., a compact disk, DVD-ROM, DVD±R, CD-ROM, CD±R, holographic disk), a thermomechanical memory (e.g., scanning-probe-based data-storage), or any type of machine readable (computer readable) storing medium. Each computer system may also include addressable memory (e.g., random access memory, cache memory) to store data and/or sets of instructions that may be included within, or be generated by, the machine-readable instructions when they are executed by a processor on the respective platform. The methods and systems described herein may also be implemented as machine-readable instructions stored on or embodied in any of the above-described storage mechanisms.

Although the present invention has been described with reference to particular examples and embodiments, it is understood that the present invention is not limited to those examples and embodiments. The present invention as claimed therefore includes variations from the specific examples and embodiments described herein, as will be apparent to one of skill in the art.

What is claimed is:

1. A non-transitory computer-readable medium storing instructions that when executed by a processor, perform a method comprising:
receiving encoded image data organized into a plurality of slices, each slice representing a portion of the encoded image data, wherein each of the plurality of slices includes encoded image data generated from run length coded transform coefficients of the image data, the transform coefficients of each block in the portion scanned according to a scan direction in which coefficients at common positions at each of their respective blocks are grouped together;
accessing a slice table storing data representing locations of the plurality of slices within a bitstream;
for each processor in a plurality of processors, using the slice table to identify a beginning of a new slice in the bitstream; and
decoding, at each processor, at least a portion of the respective identified slice.

2. The non-transitory computer-readable medium of claim 1, wherein each processor decodes a different slice than each other processor.

3. The non-transitory computer-readable medium of claim 1, wherein the low-frequency transform coefficients are coded before high-frequency coefficients.

4. The non-transitory computer-readable medium of claim 1, wherein decoding an initial portion of the coefficients generates a down-sized version of the source image.

5. The non-transitory computer-readable medium of claim 1, wherein decoding an initial portion of the coefficients generates a reduced-quality version of the source image.

6. The non-transitory computer-readable medium of claim 1, wherein coded data of each slice is self-contained to be decodable independently of coded data of other slices.

7. The non-transitory computer-readable medium of claim 1, wherein the slice table provides direct access to the slices when the coded image data is received as a serial bitstream.

8. A system comprising:
a non-transitory storage medium to store encoded data, the encoded data containing image data run-level coded in a scan direction that traverses sequentially across each one of a plurality of blocks at a common transform coefficient position before advancing to another transform coefficient position, such that transform coefficients at like positions in multiple blocks of a source image are coded together; and
a plurality of processors configured to decode the encoded data, the decoding comprising:
for each processor, accessing a slice table storing data representing locations of the plurality of slices within a bitstream to identify a beginning of a new slice in the bitstream, and
decoding, at each processor, at least a portion of the respective identified slice.

9. The system of claim 8, wherein each processor decodes at least a portion of a different slice than each other processor.

10. The system of claim 8, wherein the encoded data is organized into encoded slices on the storage medium such that decoding an initial portion of the encoded slices generates a down-sized version of the source image.

11. The system of claim 8, wherein the encoded data is organized into encoded slices on the storage medium such that decoding an initial portion of the coefficients generates a reduced-quality version of the source image.

12. The system of claim 8, wherein coded data of each slice is self-contained to be decodable independently of coded data of other slices.

13. The system of claim 8, wherein the slice table provides direct access to the slices when the encoded data is stored as a serial bitstream.

14. A method for decoding a bitstream, comprising:
using a slice table, locating a plurality of slices to be decoded in the bitstream, each slice comprising encoded image data, wherein the encoded image data is generated from run length coded transform coefficients of a plurality of blocks in the slice, scanned according to a scan direction in which coefficients at common positions at each of their respective blocks are grouped together;
using a plurality of processors, for each processor:

jumping to a beginning of a slice in the plurality of slices; and decoding at least a portion of the slice.

15. The method of claim 14, wherein the decoded portion of the slice is a portion of the slice sufficient to display a down-sized version of an image encoded in the bitstream on a screen, the screen being smaller than the size of a source image.

16. The method of claim 14, wherein the decoded portion of the slice is a portion of the slice sufficient to display an image encoded in the bitstream on at a quality lower than the source image.

17. The method of claim 14, wherein coded data of each slice is self-contained to be decodable independently of coded data of other slices.

18. The method of claim 14, wherein the slice table provides direct access to the slices when the encoded image data is received as a serial bitstream.

19. The method of claim 14, wherein the slice table provides information about the size of each slice.

20. The method of claim 14, wherein each processor decodes at least a portion of a different slice than each other processor.

* * * * *